(12) United States Patent
Sanger

(10) Patent No.: US 11,932,536 B2
(45) Date of Patent: Mar. 19, 2024

(54) HYDROGEN AUTOTHERMAL REFORMING PROCESS

(71) Applicant: Robert John Sanger, Mount Prospect, IL (US)

(72) Inventor: Robert John Sanger, Mount Prospect, IL (US)

( * ) Notice: Subject to any disclaimer, the term of this patent is extended or adjusted under 35 U.S.C. 154(b) by 0 days.

(21) Appl. No.: 16/992,740

(22) Filed: Aug. 13, 2020

(65) Prior Publication Data

US 2021/0002133 A1 Jan. 7, 2021

Related U.S. Application Data

(60) Provisional application No. 62/860,941, filed on Jun. 13, 2019.

(51) Int. Cl.
*C01B 3/38* (2006.01)

(52) U.S. Cl.
CPC ...... *C01B 3/382* (2013.01); *C01B 2203/0244* (2013.01); *C01B 2203/043* (2013.01); *C01B 2203/0495* (2013.01); *C01B 2203/0822* (2013.01); *C01B 2203/0883* (2013.01); *C01B 2203/0894* (2013.01); *C01B 2203/1241* (2013.01); *C01B 2203/1258* (2013.01); *C01B 2203/1294* (2013.01); *C01B 2203/146* (2013.01); *C01B 2203/1604* (2013.01); *C01B 2203/1619* (2013.01); *C01B 2203/1671* (2013.01)

(58) Field of Classification Search
CPC ............ C01B 3/382; C01B 2203/0244; C01B 2203/043; C01B 2203/0495; C01B 2203/0822; C01B 2203/0883; C01B 2203/0894; C01B 2203/1241; C01B 2203/1258; C01B 2203/1294; C01B 2203/146; C01B 2203/1604; C01B 2203/1619; C01B 2203/1671; C01B 2203/0827; C01B 2203/16; C01B 2203/1695; Y02P 20/10

See application file for complete search history.

(56) References Cited

U.S. PATENT DOCUMENTS

| | | | | |
|---|---|---|---|---|
| 4,919,844 A | * | 4/1990 | Wang | B01J 8/062 252/373 |
| 6,156,084 A | * | 12/2000 | Bonville, Jr. | C10G 29/04 208/244 |
| 8,282,907 B2 | * | 10/2012 | Doshi | C01B 3/382 423/652 |

(Continued)

*Primary Examiner* — Anthony J Zimmer
*Assistant Examiner* — Syed T Iqbal
(74) *Attorney, Agent, or Firm* — Law Office of Marc D. Machtinger, Ltd.

(57) ABSTRACT

A process for on-site hydrogen reforming is disclosed. The process includes providing a combined reformer heat exchanger component in which heated air, steam, and hydrocarbon fuel react to form process gas containing hydrogen, and the process gas is cooled via the heat exchanger. The combined components enable reductions in size, materials, costs, and heat loss. Additionally, as the heat exchanger side of the component operates at a cooler temperature, an uninsulated flange for access to the catalyst chamber can be used. A combined combustion heat exchanger component is also provided with similar advantages. Process gas is processed, and hydrogen gas is produced via a purification process.

20 Claims, 3 Drawing Sheets

(56) References Cited

U.S. PATENT DOCUMENTS

| | | | |
|---|---|---|---|
| 2010/0086451 A1* | 4/2010 | Allam | C01B 3/36 422/149 |
| 2015/0078970 A1* | 3/2015 | Iddir | B01J 8/12 422/216 |

* cited by examiner

HYDROGEN AUTOTHERMAL REFORMING PROCESS

CROSS-REFERENCES

This application claims the benefit of U.S. Provisional Patent Application No. 62/860,941 filed on Jun. 13, 2019, which is hereby incorporated by reference in its entirety.

BACKGROUND OF THE INVENTION

Field of the Invention

The present invention relates to hydrogen reforming processes, and more particularly, to improved on-site hydrogen reforming processes.

Background

Numerous manufacturing industries make use of hydrogen gas in their manufacturing processes. Industries such as manufacturers of flat glass, metals, electronics, and edible oils use over 2,000 tons of hydrogen per day, worldwide. Thus, the demand for hydrogen gas is high.

Hydrogen gas is commonly produced via a process referred to as autothermal reforming. Many industries have relied on purchasing hydrogen gas which has been centrally produced in large quantities and must be delivered to the manufacturer's site. Centrally produced hydrogen gas processes at large central production facilities focus on high product efficiency, and initial equipment costs are of minimal importance. Thus, such systems tend to be unfeasible for use in on-site hydrogen production. But hydrogen costs to manufacturers can be high, in part due to transportation costs.

In order for a manufacturer to be able to use an on-site hydrogen production system, it must meet various requirements. The costs of the system must be competitive with delivered hydrogen, it must be efficient enough to be economical, and the must be sufficiently compact for on-site use.

Various on-site systems and processes for hydrogen production have been proposed. For example, U.S. Pat. No. 8,282,907, issued to Doshi and Sanger on Oct. 9, 2012, discloses a hydrogen generation process which includes a reformer, a separate heat exchanger used to cool process gas and convert water to steam to be fed back into the reformer, a combustion burner, and two separate heat exchanges to heat water and air, respectively, via flue gas from the combustion burner. These multiple separate components result in unacceptably high equipment costs, a large physical footprint, heat loss between components, and inefficiency.

U.S. Pat. No. 9,156,690, issued to Doshi et al., on Oct. 13, 2015, discloses another hydrogen generation process intended for on-site use. Two separate heat exchangers are used to heat water and convert it to steam, and to heat fuel. The combined steam and heated fuel are fed into a separate reformer component. Additionally, two separate heat exchangers are used to heat water and air via flue gas from a separate combustion burner, to be used as inputs to the reformer. Again, these multiple separate components result in unacceptably high equipment costs, a large physical footprint, heat loss between components, and inefficiency.

While such previous disclosures of hydrogen generation process attempt to provide a feasible process for on-site use, due to the equipment costs, inefficiency, and physical size, they do not provide manufacturers with a feasible alternative to centralized production of hydrogen. Furthermore, reformer chambers in the prior art operate at high temperatures and require expensive insulated access flanges so that maintenance can be performed. Thus, an improved on-site hydrogen production process which overcomes the shortcomings of prior processes is needed.

SUMMARY

The present invention is an improved hydrogen autothermal reforming process. The process includes providing a combined reformer heat exchanger component. The combined reformer heat exchanger component includes a first chamber which is the reformer chamber, and a heat exchanger chamber, within the same component.

Heated air, steam, and fuel, are provided to the reformer chamber. The fuel is preferably natural gas which has passed through a sulfur removal step. Several reactions take place inside the reformer chamber, including a combustion reaction, a reforming reaction, and a shift reaction. The resultant high temperature process gas contains hydrogen.

The process gas then passes to a heat exchanger chamber. It passes over a heat exchanger which uses water as a coolant. Thus, the process gas is cooled substantially by the time it reaches the opposite end of the heat exchanger chamber and exits. The water used as a coolant within the heat exchanger is converted to steam, and is fed into the reforming chamber, combining with the fuel, heated air, and the other steam input.

By providing the reformer chamber and the heat exchanger within a single combined component, multiple benefits are achieved. A reduction in equipment materials, size, and cost is achieved. Such reductions are crucial for the efficacy of an on-site hydrogen production process. Furthermore, there is a reduction in heat loss in the system, and the process is rendered more efficient as the steam from the heat exchanger is allowed to enter directly into the reformer chamber from within the same component.

The reformer chamber portion of the combined component includes a catalyst section to enhance the reforming reaction. Catalysts require periodic maintenance and replacement. In order to achieve this, an access element must be provided. In the separate reformer components of the prior art, the operating temperature is very high. Thus, a flange with fasteners for access used in prior art processes must be insulated, and is an expensive component and subject to degradation. One of the advantages of the combined reformer heat exchanger component of the present invention is that an access element can be provided at the far end of the heat exchanger side of the combined component. As this end of the heat exchanger is exposed to a much lower operating temperature, and less costly uninsulated flange may be provided to enable access to the catalyst section at the other end of the component.

Process gas leaving the combined reformer heat exchanger component is preferably further cooled via a second heat exchanger, then passed to a water removal step. Finally, a hydrogen purification step is provided in which a hydrogen product containing mostly purified hydrogen for use in various manufacturing operations is extracted. The remaining components separated from the hydrogen product, referred to as waste gas, exit the hydrogen purification process.

In various preferred embodiments, a combined combustion heat exchanger component is also provided. Waste gas from the hydrogen purification step, containing some remaining hydrocarbon fuel, is fed into the combustion chamber portion of this combined component, along with air. Optionally, additional fuel is added either on startup or in a low purity mode of use. Combustion occurs in the combustion chamber, and optionally, a secondary input of air is added post-combustion to cool the resultant flue gas. Within the same combined component is a heat exchanger section, preferably including a third heat exchanger using water as a coolant, and a fourth heat exchanger using air as a coolant.

As hot flue gas passes over the third and fourth heat exchangers, the water is heated and converted to steam, and the air is heated. The steam exiting the third heat exchanger, and the heated air exiting the fourth heat exchanger are preferably used as the inputs to the reformer chamber as described above.

By providing a combined combustion heat exchanger component as opposed to separate components, various benefits are achieved over the prior art. A reduction in equipment materials, size, and cost is achieved. Such reductions are crucial for the efficacy of an on-site hydrogen production process. Furthermore, there is a reduction in heat loss in the system.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings, wherein like reference numerals represent like features, and description are to be regarded as illustrative in nature and not as restrictive.

DETAILED DESCRIPTION OF THE INVENTION

Figure 1:
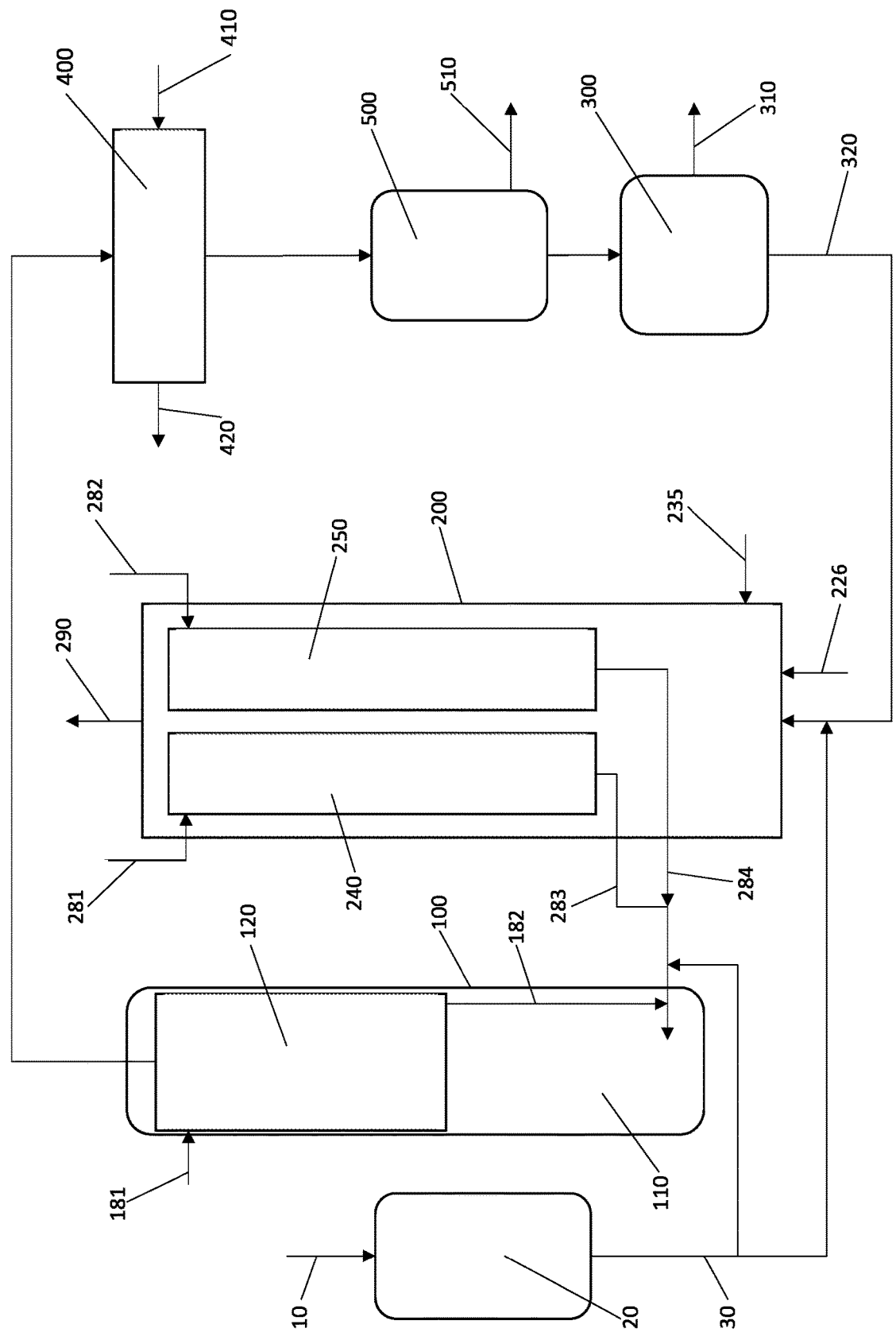
FIG. 1 shows a schematic view of one embodiment of the hydrogen reforming process according to the present invention.
Figure 2:
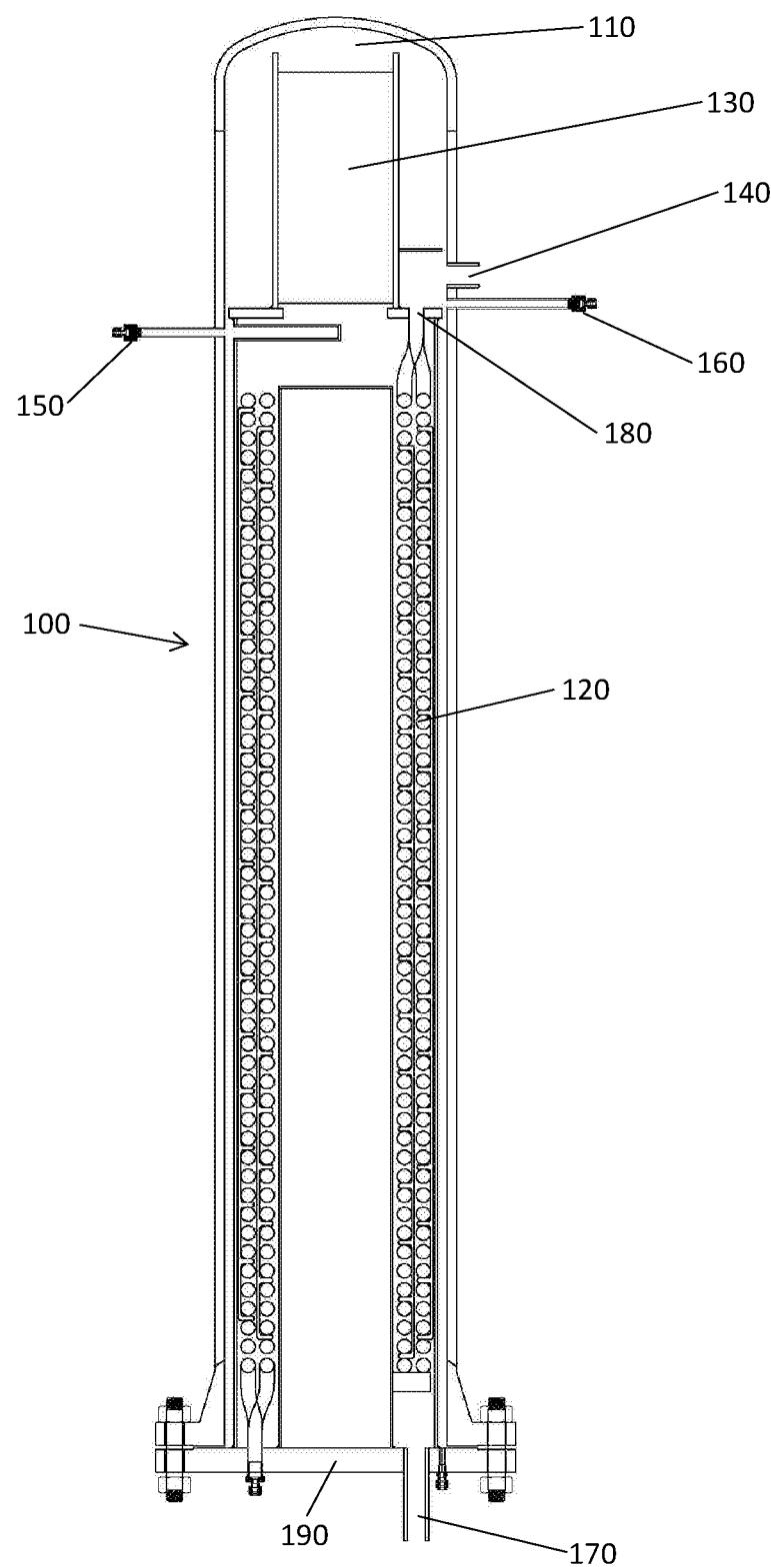
FIG. 2 shows a sectional view of the combined reformer heat exchanger component of one embodiment of the hydrogen reforming process according to the present invention.
Figure 3:
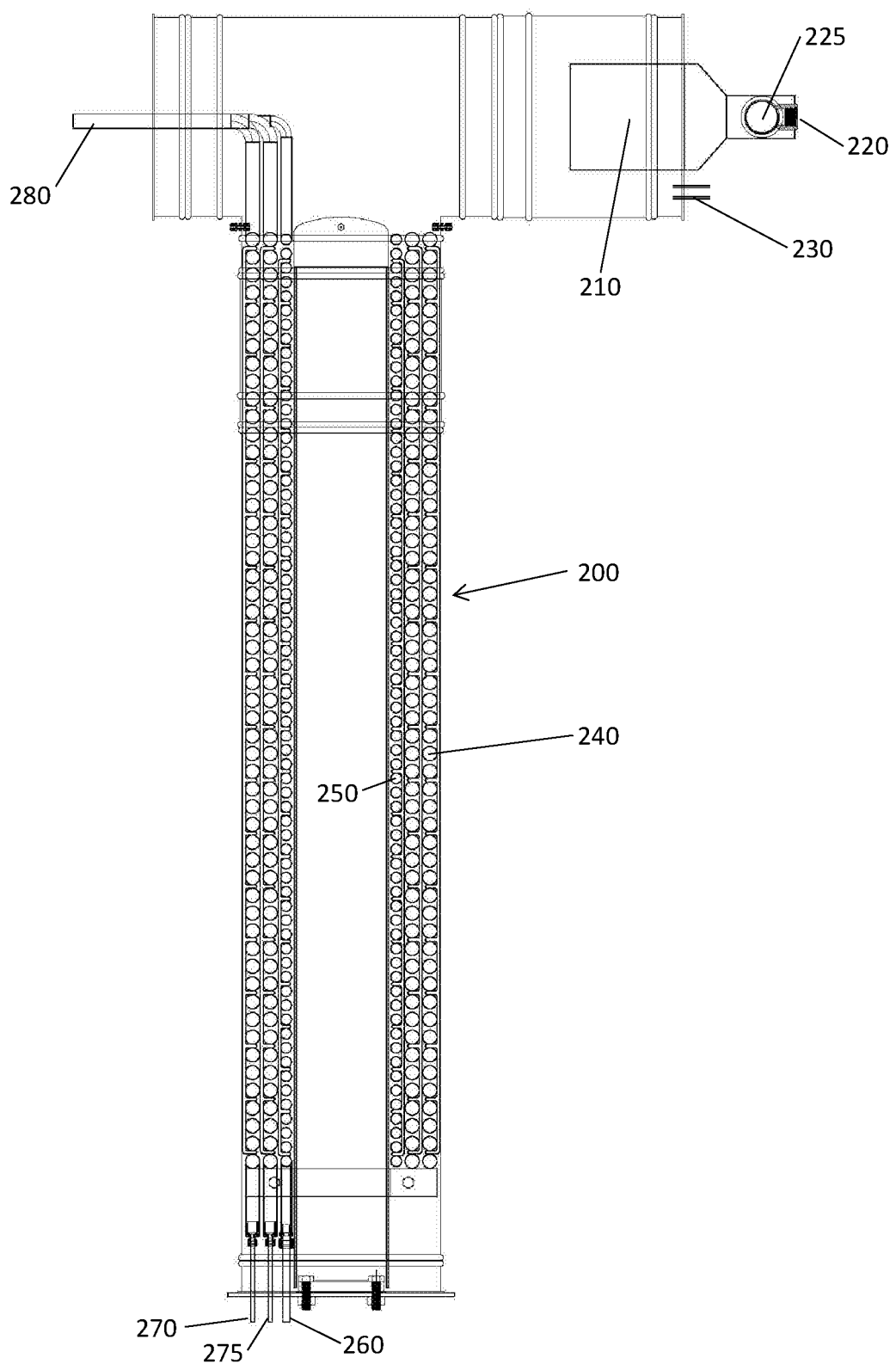
FIG. 3 shows a sectional view of the combined combustion heat exchanger component of one embodiment of the hydrogen reforming process according to the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

A hydrogen reforming process designed for efficient, cost-effective on-site use is disclosed. The process includes providing a combined reformer heat exchanger component 100. The combined reformer heat exchanger component 100 includes a first chamber 110 adapted to enable a reforming reaction. Fuel 30 is input into the first chamber 110 at entrance port 140. The fuel 30 can be any suitable hydrocarbon fuel. In certain preferred embodiments, the fuel 30 is in the form of natural gas or methane. Heated air 284 and steam 283 are also input into first chamber 110 at entrance port 140.

Preferably, first chamber 110 includes a catalyst section 130 having at least one catalyst element, and ideally at least two catalyst elements. In preferred embodiments, the catalyst elements may be monolith or bifunctional catalysts which enhance the reformation reaction at lower temperatures.

Generally, three reactions occur within the first chamber 110. A combustion reaction takes the hydrocarbon fuel and oxygen and produces carbon dioxide and water. This reaction produces heat. A reformation reaction takes steam and hydrocarbon fuel, and produces hydrogen and carbon monoxide. Furthermore, a shift reaction occurs, which takes carbon monoxide and water steam, and produces carbon dioxide and hydrogen. These reactions result in a process gas which contains hydrogen.

The process gas leaves the first chamber 110 and enters the second chamber 120. Ideally, a thermocouple 150 measures the temperature of the process gas after the reforming reaction before it enters the first heat exchanger within chamber 120. It is ideally adapted to regulate the amount of heated air 284 input into the first chamber 110. The temperature of the process gas at that stage is ideally approximately 700° C.

In the second chamber 120, a first heat exchanger is provided, preferably in the form of coiled metal tubing. Water 181 is run into the tubing, and the process gas flows through the heat exchanger and cools to a temperature on the order of 150° C. to 180° C. The water 181 is heated and converted to steam, and the steam then enters the first chamber 110 at opening 180 and is combined with the previously described inputs. A thermocouple 160 is optionally included to monitor the temperature of the steam leaving the first heat exchanger.

By providing the reformer and first heat exchanger as a single combined component, numerous benefits are achieved. The size of the equipment is reduced, the equipment costs are reduced, and heat loss between the heat exchanger and the reformer is reduced, producing a more efficient process.

The process of the present invention preferably includes providing an access element 190 to the combined reformer heat exchanger component 100. The catalyst section 130 may require periodic maintenance or replacement. The access element 190 enables access to the catalyst section 130. Ideally, the access element 190 is a flange, preferably located at a far end of the second chamber 120, at which location the temperature is kept much lower than the temperature within the first chamber 110. This enables an uninsulated flange to be used.

In various preferred embodiments, process gas containing hydrogen, also known as "syn gas," then leaves the combined reformer heat exchanger component 100 via port 170. Preferably, the process gas is cooled further such as via a second heat exchanger 400. A coolant, such as air or water 410 and the heated coolant 420 exits the second heat exchanger 400. Thus, the process gas is cooled down, preferably to a temperature in the vicinity of 35° C.

In various embodiments, water 510 is removed from the process gas via a water removal component 500 before the purification step. Next, a hydrogen purification step is provided. Any suitable hydrogen purification method can be used in this step. In certain preferred embodiments, a pressure swing absorption (PSA) method is used. Preferably, the process gas enters a hydrogen purification component 300, in which hydrogen is separated from the remaining components of the process gas. The hydrogen product 310 leaves the system at this stage in a purified state, for use in various desired manufacturing activities. The purity of the hydrogen product 310 can vary, depending on needs. A waste gas 320, usually containing some amount of hydrogen and unconverted fuel, exits the hydrogen purification component.

In various preferred embodiments, the process of the present invention includes providing a combined combustion heat exchanger component 200. The combined component 200 includes a combustion chamber 210, and a heat exchanger section including a third heat exchanger 240 adapted to heat water, and a fourth heat exchanger 250 adapted to heat air. By combining a combustion chamber 210 with the third and fourth heat exchangers 240 and 250, numerous benefits are achieved including reduction in equipment size, materials, and cost, and reduction of heat loss between components.

Preferably, waste gas 320 from the hydrogen purification step is fed into the combustion chamber 210 via port 220. Air, such as ambient air 226, enters via port 225. Typically, the waste gas 320 contains enough hydrogen and unreacted hydrocarbon fuel that combustion will occur in combustion chamber 210. Secondary air 235 is preferably added into the combustion chamber via port 230, post combustion, in order to cool the resulting flue gas 290 before it enters the heat exchanger section.

In various embodiments, additional fuel 30 is optionally provided into the combustion chamber. Such additional fuel 30 may be provided in a startup mode only in order to begin the combustion process before waste gas 320 is available. Optionally, in a low purity mode of use in which waste gas 320 contains less hydrogen, additional fuel 30 may be provided throughout the process.

In certain embodiments, the user is provided with a control for selectively switching between a high purity mode and a low purity mode, and the system may detect the selection of the low purity mode, either by the user's selection or by detecting the amount of hydrogen present in waste gas 320, or the hydrogen purity of hydrogen product 310. Then, if a low purity mode is detected, additional fuel 30 is automatically provided to combustion chamber 210 in the low purity mode of use.

In various preferred embodiments, the third heat exchanger 240 uses water 281 as a coolant, entering at ports 270 and 275. As flue gas 290 passes over the third heat exchanger 240, the water 281 is converted to steam 283, and steam 283, exiting at port 280, is used as the input previously described into the combined reformer heat exchanger component 100. Similarly, the fourth heat exchanger 250 uses air 282 as a coolant, entering at port 260. Flue gas 290 passes over the fourth heat exchanger 240, and heated air 284 exits via port 280 and is used as the input previously described into the combined reformer heat exchanger component 100.

Typically, the fuel provided into the system is any suitable form of hydrocarbon fuel. One common fuel used in this process is natural gas composed mostly of methane. In various preferred embodiments, sulfur is removed from the sourced hydrocarbon fuel 10 via a sulfur removal component 20. This may be facilitated via an absorbent bed containing one or more types of absorbent materials. The resultant sulfur-free or mostly sulfur-free hydrocarbon fuel 30 is then available to be used as an input into the combined reformer heat exchanger component 100, and optionally, to the combined combustion heat exchanger component 200. Removal of this sulfur reduces corrosion and poisoning of catalysts in the system.

While specific embodiments have been illustrated and described, numerous modifications come to mind without significantly departing from the spirit of the invention and the scope of protection is limited by the scope of the accompanying claims.

What is claimed is:

1. A hydrogen reforming process comprising the steps of:
   providing a combined reformer heat exchanger component having a first chamber adapted to enable a reforming reaction and a second chamber adapted to house a first heat exchanger,
   inputting fuel into said first chamber of said reformer heat exchanger component,
   inputting heated air and steam into said first chamber of said reformer heat exchanger component, wherein said air is heated external to said combined reformer heat exchanger component,
   enabling a reforming reaction to produce a process gas containing hydrogen in said first chamber of said reformer heat exchanger component,
   feeding said process gas into said second chamber of said reformer heat exchanger component,
   inputting liquid water into said first heat exchanger, wherein said water is heated and converted to steam within said first heat exchanger wherein the steam is used in said step of inputting heated air and steam into said first chamber of said reformer heat exchanger component,
   cooling said process gas in said second chamber of said reformer heat exchanger component and allowing said process gas to leave said reformer heat exchanger component at a heat exchanger exit,
   further cooling said process gas after it leaves said reformer heat exchanger component, and
   purifying said process gas and producing a hydrogen product.

2. The method according to claim 1, further comprising the step of:
   providing a catalyst section having at least one catalyst element within said first chamber of said reformer heat exchanger component to assist in the reforming reaction.

3. The method according to claim 2, further comprising the step of:
   providing an access element at a section of said second chamber of said reformer heat exchanger component adapted to allow access and maintenance of said catalyst section in said first chamber.

4. The method according to claim 3, wherein the step of providing an access element comprises providing an access element at a far end of said second chamber opposite to an end adjacent said first chamber.

5. The method according to claim 4, wherein said access element comprises a flange.

6. The method according to claim 4, wherein said access element is uninsulated.

7. The method according to claim 5, wherein said flange is uninsulated.

8. The method according to claim 2, wherein the step of further cooling said process gas comprises providing a second heat exchanger adapted to cool said process gas using a coolant.

9. The method according to claim 1, further comprising the steps of:

providing a combined combustion heat exchanger component having a combustion chamber and a heat exchanger section comprising a third heat exchanger adapted to heat water and convert it into steam and a fourth heat exchanger adapted to heat air, and wherein the step of inputting heated air and steam into said first chamber comprises inputting air heated by said fourth heat exchanger and inputting steam produced by heating water via said third heat exchanger.

10. The method according to claim 9, further comprising the steps of:
inputting waste gas, separated from the process gas during the step of purifying said process gas and producing a hydrogen product, into said combustion chamber,
inputting air at a first input port into said combustion chamber,
enabling said waste gas to combust within said combustion chamber and produce flue gas, and
passing said flue gas over said third and fourth heat exchangers.

11. The method according to claim 10, further comprising the step of:
inputting air into said combustion chamber at a second input port after combustion to cool said flue gas.

12. The method according to claim 8, further comprising the step of:
removing water from said process gas via a water removal component after the step of further cooling said process gas.

13. The method according to claim 12, further comprising the step of:
removing sulfur from said fuel before the step of inputting fuel into said first chamber of said reformer heat exchanger component.

14. The method according to claim 10, further comprising the step of:
inputting fuel into said combustion chamber in addition to said waste gas in a startup mode.

15. The method according to claim 14, further comprising the step of:
inputting fuel into said combustion chamber in addition to said waste gas in a low purity mode.

16. The method according to claim 15, further comprising the step of:
providing a control for a user to selectively switch between a high purity mode and said low purity mode, and
wherein said step of inputting fuel into said combustion chamber in addition to said waste gas in a low purity mode comprises automatically detecting said low purity mode and inputting fuel into said combustion chamber under the conditions that said low purity mode is detected.

17. The method according to claim 2, further comprising the step of:
providing a thermocouple adapted to measure temperature of said process gas after the reforming reaction before it enters said first heat exchanger and adapted to regulate the amount of said heated air input into said first chamber.

18. The method according to claim 1, further comprising the steps of:
providing a water input into said first heat exchanger as a coolant,
providing steam output from said first heat exchanger as an additional input into said first chamber.

19. The method according to claim 9, further comprising the steps of:
providing a water input into said first heat exchanger as a coolant,
providing steam output from said first heat exchanger as an input into said first chamber in addition to the steam from said third heat exchanger.

20. The method according to claim 1, wherein said fuel comprises natural gas or methane.

* * * * *